United States Patent [19]

Arnoldy

[11] Patent Number: 4,723,060
[45] Date of Patent: Feb. 2, 1988

[54] FEEDER EQUALIZER AND HOMOGENIZER

[76] Inventor: Roman F. Arnoldy, P.O. Box 40472, Houston, Tex. 77040

[21] Appl. No.: 928,612

[22] Filed: Nov. 4, 1986

Related U.S. Application Data

[63] Continuation of Ser. No. 751,928, Jul. 5, 1985, abandoned.

[51] Int. Cl.$^4$ ............................................. B23K 9/18
[52] U.S. Cl. ..................................... 219/73.2; 219/73
[58] Field of Search ....................... 219/73, 73.2, 73.21

[56] References Cited

U.S. PATENT DOCUMENTS

| | | | |
|---|---|---|---|
| 2,189,399 | 2/1940 | Lewbers | 219/73.2 X |
| 2,191,471 | 2/1940 | Hopkins | 219/73.21 |
| 2,678,987 | 5/1954 | Talley | 219/73 |
| 2,778,910 | 1/1957 | Landis et al. | 219/73.2 X |
| 3,172,991 | 3/1965 | Arnoldy | 219/73.2 |
| 3,415,975 | 12/1968 | Johnson | 219/73 |
| 3,804,245 | 4/1974 | Pendleton | 219/73.2 X |
| 3,898,415 | 8/1975 | D'Acremont | 219/73 |

FOREIGN PATENT DOCUMENTS

| | | | |
|---|---|---|---|
| 221875 | 9/1968 | U.S.S.R. | 219/73 |
| 602326 | 4/1978 | U.S.S.R. | 219/73.2 |

Primary Examiner—E. A. Goldberg
Assistant Examiner—Catherine Sigda
Attorney, Agent, or Firm—Vaden, Eickenroht, Thompson & Boulware

[57] ABSTRACT

An improved feeder for feeding particulate materials to a weld zone wherein the particles of different materials fed are in desired proportions to each other at any cross-section of the outlet device, the feeder converting an intermittent feed to a continuous homogeneous flow and having dispersal apparatus positioned within the feeder so that welding material to be fed to the weld zone must pass through the dispersal apparatus.

5 Claims, 2 Drawing Figures

FEEDER EQUALIZER AND HOMOGENIZER

This application is a continuation of application Ser. No. 06/751,928 now abandoned, filed July 5, 1985.

BACKGROUND OF THE INVENTION

1. Field of the Invention

The present invention is directed to new and improved granular material transmission means for feeders for welding, cladding, overlaying and the like, and particularly apparatus wherein granular or powdered alloy materials for producing an alloy weld are fed and deposited in desired amounts on the area to be fusion welded or weld overlayed and the like which provides an alloy weld of a predetermined composition.

2. Description of the Prior Art

Due to the difficulty of providing homogeneous mixtures to the weld zone, a major problem in fusion welding or weld overlaying is the provision of alloy welds of uniform composition or analysis. For example, premixing of metals does not consistently provide homogeneous mixtures to the work because the heavier metal particles settle out; the larger particles rise to the surface; and the more angular particles rise to the top in storage, transportation or other movement. The same problem exists in premixing flux.

In the process of performing bulkwelding or thermal or plasma spraying, it is either desirable or necessary (depending on the operation) to feed powder to the welding means so that a cross section of the powder stream at any point contains the proper percentages of each ingredient to give the desired analysis to the weld being deposited. Also, it is either desirable or necessary that the rate of flow of these powders be uniform so as to avoid plugging the apertures through which the powder has to flow or overloading momentarily the heating means for melting the powder and causing voids in the welds. In a premixed powder, the blend will be uniform if (1) the particles are in the same general area of size; (2) the particles are either all angular or all round; and (3) the particles are in the same area of density. Otherwise, the large particles and the angular particles rise and the round particles and the heavy particles sink, giving a non-uniform analysis to the weld. The same problems exist in premixing flux materials, as used in open arc or submerged arc welding.

The provision of a feeder which uniformly feeds homogeneous mixtures of metal alloy materials to the work and by which a fusion weld or weld overlay is obtained of uniform composition or analysis in either open arc, submerged arc, submerged or gas-shielded welding has been highly desirable. It would also be desirable to simultaneously feed materials in desired uniform amounts so that uniform accurate, predetermined, homogeneous mixtures are obtained and fed to the weld zone without any special or expensive processing or premixing of the various metals. It would be desirable to provide a feeder capable of uniformly feeding a variety of materials, such as non-compatible materials, to the weld zone simultaneously, without any unwanted slugs or globules of agglomerated particles entering the weld zone.

In the usual metering equipment for bulk-welding (my U.S. Pat. Nos. 3,060,307 and 3,179,991), feeding is accomplished by a wheel (or wheels) which contain pockets on the periphery, and which pockets dump their contents at short intervals while the wheel turns. Thus, the feeding of material is in short batches (or slugs) in an intermittent manner. This feeding can overload the orifices through which the powder must pass as well as momentarily overloading the powder melting means as described above.

My copending application Ser. No. 657,434 filed Oct. 3, 1984, is directed to a multiple feeder apparatus for welding which has a plurality of material feeding elements, each of which feeds weld material from a material-containing hopper to feed tubes which transmit the weld material to a single tube feeding into a weld material distributor. Slugs of weld material can pass from the hoppers to the weld zone, adversely affecting the weld deposit and final welding product.

SUMMARY OF THE INVENTION

The present invention is directed to an improved welding apparatus which provides for the homogenized uniform dispersed deposit of granular or powdered welding material onto the area of a welding zone. Many welding apparatuses use a hopper, bin or container for holding welding material above, adjacent or near an area or workpiece to be welded. Various means are employed to transport the welding material from the container to the site of the welding operation, including for example feeder tubes and nozzles through which the welding material flows either by gravity or under pressure. Rotating feeder wheels employing scoop pockets deliver intermittent slugs or charges of powder or weld material to the workpiece. The present invention has a material dispersal device such as a screen or screens within the weld material transmitting apparatus to provide a continuous steady even flow of well-mixed material to the weld zone. One or more dispersal devices can be used and they can have the same or different opening spacing. Depending on the spacing chosen, the amount of mixing and the time for passage through the transmission means can be varied. The orientation of multiple dispersal devices with respect to each other can be varied as well as the spacing interval between them. Furthermore, they can be provided in individual feeder tubes only, in common feeder tubes only, in feed nozzles, or in any combination thereof.

It is an object of the present invention to provide an improved feeder apparatus for welding including but not limited to open arc, series arc, submerged arc, or gas-shielded welding by which a homogeneous mixture of desired dispersed amounts of materials are continuously fed in a steady flow to the area of a weld zone.

Still another object of the present invention is the provision of a feeder apparatus in which varying amounts of welding materials are homogeneously and continuously fed simultaneously in a dispersed flow with electrode wire feed, by which all types of alloy welding can be accomplished efficiently and in which the alloy weld deposited is of a controlled, desired, uniform composition.

An additional object of the present invention is the provision of such an improved feeder which coordinates the homogeneous mixing and the continuous dispersed deposition of alloy materials.

Another particular object of the invention is the provision of a feeder in which several feeding elements can be easily and readily used for homogeneously and continuously feeding a number of dispersed materials to the work simultaneously and in predetermined relationship, yet independently of one another.

An additional object of the present invention is the provision of dispersal and homogenizing means in the weld material transmitting apparatus of a welding apparatus for homogeneously and continuously feeding dispersed welding material from the apparatus's material container onto the area of the weld zone.

Yet another object of the present invention is the provision of such an apparatus in which dispersal apparatus such as a screen or screens are placed within the means for transmitting the weld material from its container to the weld zone.

A particular object of the present invention is the provision of such an apparatus in which the screens may have either the same or different mesh spacing; may be oriented at different angles to each other and at different angles with respect to the axis of the transmitting apparatus; and may be spaced apart at varying intervals within the transmitting apparatus.

Another object of the present invention is the provision of a welding apparatus in which the time for welding material or powder to pass through transmission means to the weld zone is longer than the time between charges of material or powder to the transmission means.

Yet another object of the present invention is the provision of such an apparatus in which the composition of welding material or powder taken across a cross-section of the transmission means after the material or powder is subjected to the dispersal apparatus is substantially homogeneous.

Other and further objects, features and advantages of the present invention will be apparent from the following description of presently preferred embodiments thereof, given for the purpose of disclosure, and taken in conjunction with the accompanying drawings.

DESCRIPTION OF PREFERRED EMBODIMENTS

The feeder of the present invention may be used in a variety of types of welding operations, including (but not limited to) open arc, series arc, submerged arc, gas-shielded welding, and in self-shielding welding in which one of the materials being worked with emits its own shielding gas or in which one of the materials being worked with emits material which combines with other materials to form a shielding gas.

Figure 1:
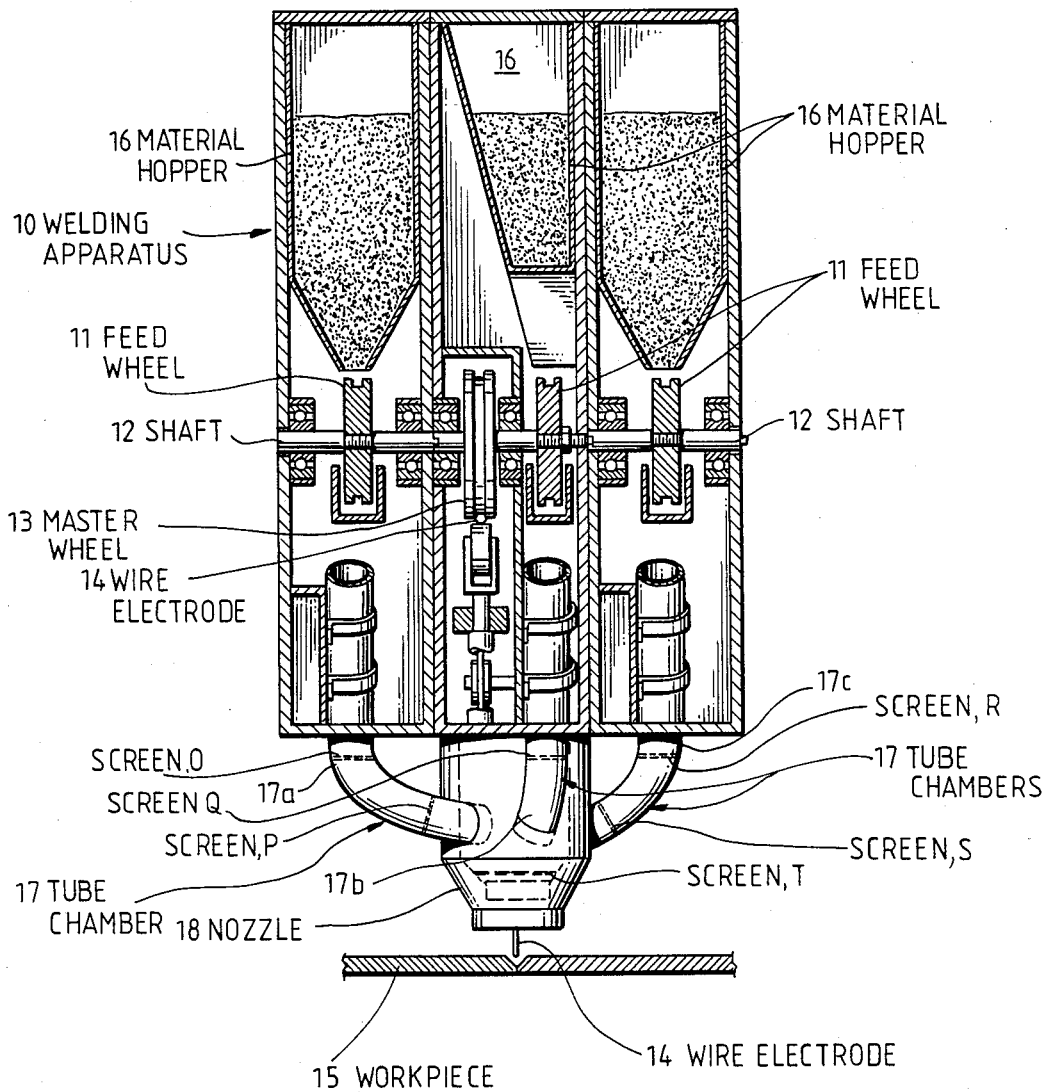
FIG. 1 is a sectional view of a prior art weld feeder device as disclosed in U.S. Pat. No. 3,172,991, with dispersal devices according to the present invention.

Referring now to FIG. 1, in one preferred embodiment of the present invention the welding apparatus 10 has multiple material feed wheels 11 which are mounted on interconnecting shafts 12 which when connected revolve as a single unit. The master wheel 13 mounted on the resulting shaft is moved in response to the feeding of the wire electrode 14 to the workpiece 15. The frictional contact of the moving wire electrode 14 moves the master wheel 13, thereby moving the shaft 12 and the feed wheels 11. The feed wheels 11 revolve beneath the material hoppers 16, the pockets in the feed wheels filling with welding material. Upon rotation of the wheel, the feed wheels intermittently empty their contents into their corresponding tube chambers 17, and the material passes through the screens O, P, Q, R, S, T, and then through the nozzle 18 and onto the workpiece in the weld zone.

As shown in FIG. 1, the tube chambers may have more than one screen, such as screens O and P in tube chamber 17a and screens R and S in tube chamber 17c; or they may have one screen such as screen Q in tube chamber 17b. Also the nozzle itself may have one screen such as screen T or it may have a plurality of screens (not shown). As illustrated in FIG. 1 the screens within a tube may be oriented non-parallel to each other. The spacing interval between screens may be varied and a larger plurality of screens may be used. Also, the screens may have the same or different mesh spacing, but whatever the mesh spacing of any particular screen it should be such that it is not so small that the granular weld particles can clog the screen, nor so large that the screen cannot break up welding material slugs of an undesirable size.

Figure 2:
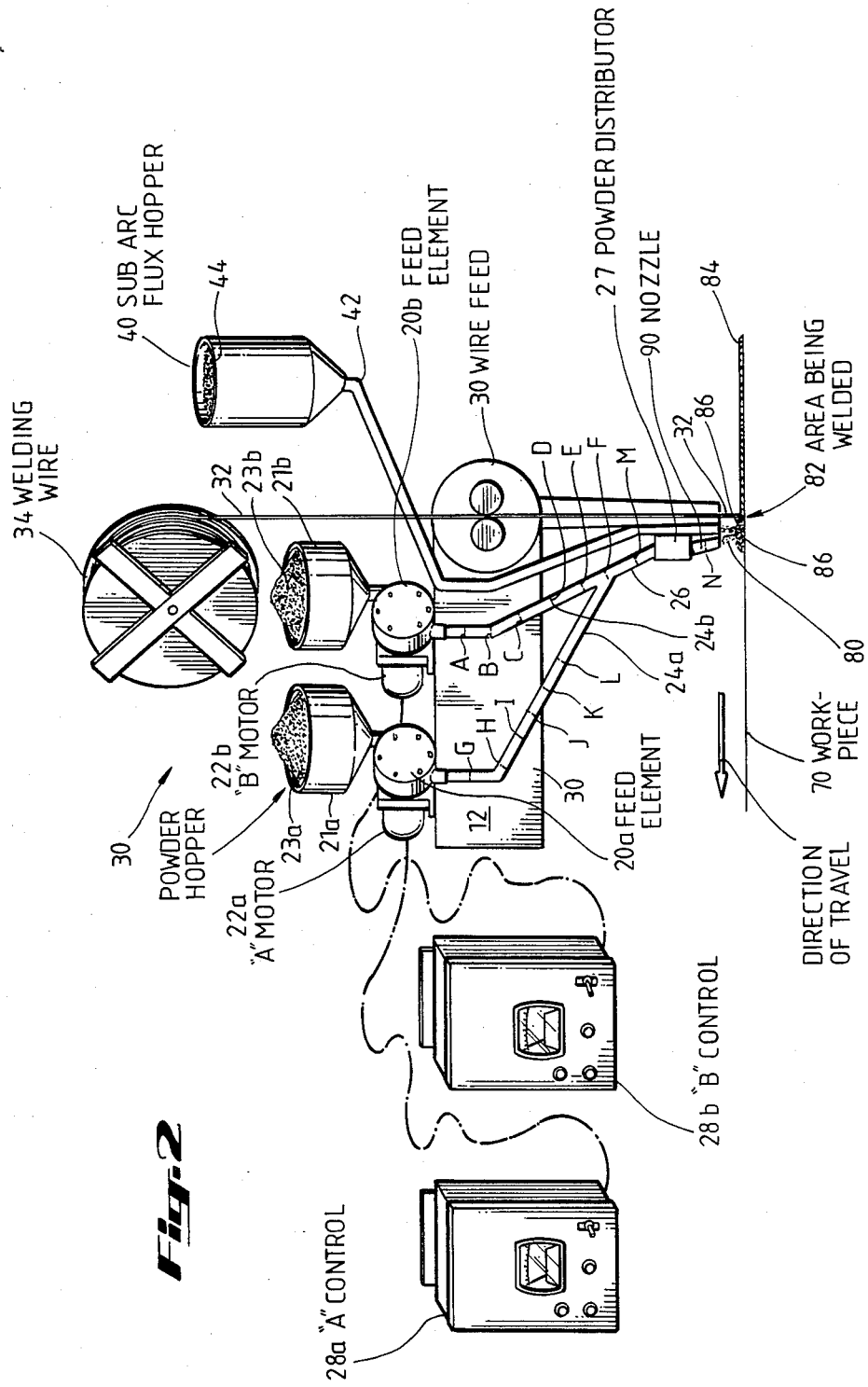
FIG. 2 is a perspective view of the welding feeder apparatus of my copending application Ser. No. 657,434 with dispersal devices according to the present invention.

Referring now to another preferred embodiment of the present invention as depicted in FIG. 2, the welding apparatus 30 has a body member 12 on which are mounted two feeding elements 20a and 20b. These feeding elements are any of the conventional feeding elements readily available in the prior art for receiving and exhausting particulate welding material, such as the well-known feed wheel elements. A hopper 21 for welding material is connected to each feeding element. Hopper 21a is connected to feed element 20a and hopper 21b is connected to feed element 20b. Also each feeding element 20a and 20b has connected to it its own motor, 22a and 22b respectively, with separate controls 28a and 28b for each motor. Since these controls are independent of each other, they can be set to produce and maintain feeds in desired proportions resulting in a uniform alloy. The possible proportions are virtually infinite.

Typically the feeding element's speed can be adjusted between a range of 2 and 32 revolutions per minute.

Feed tubes 24a and 24b serve to conduct the weld material from their corresponding feed elements to the tube 26 which feeds into the powder distributor 27. The powder distributor 27 directs the powder to the weld zone on the workpiece 70.

As shown in FIG. 2, the feeder tube 24a has disposed within it the screens G, H, I, J, K, and L at spaced apart intervals. The feeder tube 24b has the screens A, B, C, D, E, and F disposed within it as well as the screen M which is positioned in the tube 26.

In an actual working embodiment six screens of 16 mesh are used, spaced about ¼ inch apart in a feeder tube ½ inch in diameter. The screens may be parallel to each other, perpendicular to the tube axis, or randomly oriented.

As shown in FIG. 2, the screen N is provided in the nozzle 90 below the powder distributor 27. If desired, multiple screens may be employed in the nozzle 90 within the scope of present invention. Also, although only one screen is shown in the tube 26, multiple screens may be employed there.

The mesh size of the screen is chosen so that the mesh is fine enough so that more time is required for a feed wheel's charge of material to flow through the system than the time between feed wheel dumps. The spacing of screens within a particular tube is found to be satisfactory if it is not substantially less than the diameter of the tube. Screens can be placed anywhere in the feeder tubes. A number of screens is used so that continuous homogeneous mixed flow is achieved.

The wire electrode 32 is fed from the welding wire holder 34 to the weld zone 82 by the wire feed 30 which is mounted on the body member 12 independently of the feed elements 20. The wire feed 30 operates independently of the motors 22 so that the feed elements 20 can be driven at speeds different from that of the wire feed 30. The weld puddle 86 is formed by the cascade 80 of the welding materials 23a and 23b, the flux 44 from the flux hopper 40, and the wire electrode 32. As shown in FIG. 2, the flux 44 is fed to the weld puddle 86 through the tube 42. The finished weld is represented by the area designated by numeral 84. The various screens insure that the welding material applied to the area 84 is uniformly dispersed about this area.

The present invention, therefore, is well suited and adapted to attain the objects and ends and has the advantage and features mentioned as well as others inherent therein. While presently-preferred embodiments of the invention have been given for the purpose of disclosure, changes may be made therein which are within the spirit of the invention as defined by the scope of the appended claims.

What is claimed is:

1. In combination with a multiple feeder for use in welding comprising a body member, a plurality of hoppers each containing a different particulate weld material, a plurality of feed wheels rotatably mounted to the body member for feeding particualte weld materials to a weld zone, each feed wheel in communication with one of the hoppers for receiving particulate weld material from said one of the hoppers and for expelling the weld material, a discharge nozzle mounted to the body member above the weld zone, the discharge nozzle provided with a generally central passage and a chamber about the passage, electrode feeding means mounted to the body member for directing an electrode to the weld zone, electrode drive means for moving the electrode to the weld zone; a plurality of wheel transmitting tubes disposed between the feed wheels and a common transmitting tube, a wheel transmitting tube in communication with and disposed between each of the feed wheels and the common transmitting tube for transmitting into the common transmitting tube substantially all of the weld material flowing from the feed wheels, each feed wheel introducing its material into its respective wheel transmitting tube, each of the feed wheels having connected thereto its own drive motor independent of each other wheel's drive motor and independent of the electrode drive means, and each feed wheel having its own independent control means connected thereto so that the proportions of the materials fed can be independently, continuously, and accurately controlled and set as desired, the common transmitting tube connected to and in communication with the discharge nozzle for flowing the weld material into the discharge nozzle, and additional mixing means comprising:

one or more mesh screens for homogeneously mixing substantially all of the different particulate weld materials flowing through the transmitting tubes, the one or more screens disposed within the common transmitting tube for providing a continous uniform homogeneous flow of particulate weld material to the discharge nozzle for deposition onto the area of the weld zone.

2. The apparatus of claim 1 wherein there is a plurality of screens and the screens are of different mesh spacing.

3. The apparatus of claim 1 wherein there is a plurality of screens and the screens are of similar mesh spacing.

4. The apparatus of claim 1 wherein one or more mesh screens is disposed in each of the wheel transmitting tubes.

5. The apparatus of claim 1 wherein each feed wheel is able to periodically dump a charge of weld material into its corresponding wheel transmitting tube and the mesh size of the one or more screens is such that the time required for the charge of material to flow to the weld zone is longer than the time between feed wheel dumps.

* * * * *